US011703836B2

(12) United States Patent
Kajita et al.

(10) Patent No.: US 11,703,836 B2
(45) Date of Patent: Jul. 18, 2023

(54) LINE CONFIGURATION PLANNING DEVICE

(71) Applicant: Hitachi, Ltd., Tokyo (JP)

(72) Inventors: Daiki Kajita, Tokyo (JP); Atsuko Enomoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 81 days.

(21) Appl. No.: 17/210,830

(22) Filed: Mar. 24, 2021

(65) Prior Publication Data

US 2021/0311464 A1 Oct. 7, 2021

(30) Foreign Application Priority Data

Apr. 1, 2020 (JP) .................................. 2020-66127

(51) Int. Cl.
*G05B 19/418* (2006.01)

(52) U.S. Cl.
CPC . *G05B 19/41865* (2013.01); *G05B 19/41805* (2013.01); *G05B 19/41875* (2013.01)

(58) Field of Classification Search
CPC ........ G05B 19/41865; G05B 19/41805; G05B 19/41875; G05B 19/4188; G05B 2219/32009; G05B 2219/32085; G05B 2219/32086; Y02P 90/02; G06Q 10/0631
See application file for complete search history.

(56) References Cited

U.S. PATENT DOCUMENTS

| 5,630,070 A * | 5/1997 | Dietrich | ........... G06Q 10/06313 |
| | | | 705/7.23 |
| 2002/0059089 A1* | 5/2002 | Suzuki | ................... G06Q 10/06 |
| | | | 705/15 |
| 2002/0143418 A1* | 10/2002 | Ohara | ................... G06Q 10/06 |
| | | | 700/95 |

(Continued)

FOREIGN PATENT DOCUMENTS

JP 2009-142949 A 7/2009

OTHER PUBLICATIONS

Mustafa Fatih Yegul, Fatih Safa Erenay, Soeren Striepe, Mustafa Yavuz, "Improving configuration of complex production lines via simulation-based optimization," Computers & Industrial Engineering, vol. 109, 2017, pp. 295-312 (Year: 2017).*

*Primary Examiner* — Christopher E. Everett
(74) *Attorney, Agent, or Firm* — Mattingly & Malur, PC

(57) ABSTRACT

A line configuration planning device determine a task sequence during production of the to-be-produced product and the task time by the worker or the automatic machine for each task on the basis of the task information and the task time information. The line configuration planning device determine a required cycle time for producing the to-be-produced product on the basis of the production plan information. The line configuration planning device generate, on the basis of the determined task sequence, task time, and required cycle time, an allocation proposal for the worker and the automatic machine such that an estimated cycle time (Continued)

for producing the to-be-produced product is less than or equal to the required cycle time. The line configuration planning device determine a production line configuration for the to-be-produced product on the basis of the allocation proposal and the equipment configuration information.

15 Claims, 18 Drawing Sheets

(56) References Cited

U.S. PATENT DOCUMENTS

2003/0208389 A1* 11/2003 Kurihara .......... G05B 19/41865
  705/7.25
2007/0288287 A1* 12/2007 Hayler ............. G06Q 10/06311
  705/7.14
2020/0103859 A1*  4/2020 Ouyang ........... G05B 19/41865

* cited by examiner

PRODUCT CONFIGURATION INFORMATION 131

| PRODUCT | COMPONENT | COMPONENT TYPE | DIMENSIONS | SHAPE | POSITION /ORIENTATION |
|---|---|---|---|---|---|
| PRODUCT A | CASE | HARD | 400X300X150 | RECTANGULAR | (0, 0, 0, 0, 0, 0) |
| | BLOCK | HARD | 160X160X120 | RECTANGULAR | (20, 70, 10, 0, 0, 0) |
| | SCREW 11 | FASTENING | M4X10 | CYLINDER | (25, 75, 15, 0, 0, 0) |
| | SCREW 12 | FASTENING | M4X10 | CYLINDER | (25, 225, 15, 0, 0, 0) |
| | SCREW 13 | FASTENING | M4X10 | CYLINDER | (175, 75, 15, 0, 0, 0) |
| | SCREW 14 | FASTENING | M4X10 | CYLINDER | (175, 225, 15, 0, 0, 0) |
| | SUB ASSY A | — | 150X40X100 | RECTANGULAR | (225, 60, 110, 0, 0, 0) |
| | SUB BLOCK A1 | HARD | 150X40X80 | RECTANGULAR | (225, 60, 110, 0, 0, 0) |
| | SUB BLOCK A2 | HARD | 120X30X60 | RECTANGULAR | (240, 65, 10, 0, 0, 180) |
| | SCREW A11 | FASTENING | M4X8 | CYLINDER | (245, 80, 10, 0, 0, 180) |
| | SCREW A12 | FASTENING | M4X8 | CYLINDER | (355, 80, 10, 0, 0, 180) |
| | SUB ASSY B | — | 150X40X100 | RECTANGULAR | (225, 100, 110, 0, 0, 0) |
| | SUB BLOCK B1 | HARD | 150X40X80 | RECTANGULAR | (225, 100, 110, 0, 0, 0) |
| | SUB BLOCK B2 | HARD | 120X30X60 | RECTANGULAR | (240, 105, 10, 0, 0, 180) |
| | SCREW B11 | FASTENING | M4X8 | CYLINDER | (245, 120, 10, 0, 0, 180) |
| | SCREW B12 | FASTENING | M4X8 | CYLINDER | (355, 120, 10, 0, 0, 180) |
| | CABLE | FLEXIBLE | L80 | WIRING | (245, 125, 110, 0, 0, 0) |
| | SCREW 31 | FASTENING | M3X6 | CYLINDER | (340, 105, 110, 0, 0, 0) |
| | SCREW 32 | FASTENING | M3X6 | CYLINDER | (340, 125, 110, 0, 0, 0) |
| | COVER | HARD | HARD | RECTANGULAR | (0, 0, 150, 0, 0, 0) |
| | SCREW 41 | FASTENING | M5X12 | CYLINDER | (5, 5, 150, 0, 0, 0) |
| | SCREW 42 | FASTENING | M5X12 | CYLINDER | (395, 5, 150, 0, 0, 0) |
| | SCREW 43 | FASTENING | M5X12 | CYLINDER | (5, 295, 150, 0, 0, 0) |
| | SCREW 44 | FASTENING | M5X12 | CYLINDER | (395, 295, 150, 0, 0, 0) |
| PRODUCT B | ⋮ | ⋮ | ⋮ | ⋮ | ⋮ |

*FIG. 3*

AUTOMATIC MACHINE TASK INFORMATION 138

| AUTOMATIC MACHINE TYPE (381) | EXECUTABLE TASK TYPE (382) |
|---|---|
| ASSEMBLY EQUIPMENT | GRIP COMPONENT<br>ASSEMBLE COMPONENTPRESS-FIT COMPONENT<br>TIGHTEN SCREW<br>RETIGHTEN SCREW |
| WELDING EQUIPMENT | SPOT WELD<br>ARC WELD |
| COATING EQUIPMENT | COATING |
| ⋮ | ⋮ |
| VISUAL INSPECTION EQUIPMENT | VISUAL INSPECTION |
| ⋮ | ⋮ |

FIG. 6

OPERATION INFORMATION 134

| PRODUCTION SITE (341) | OPERATING CONDITION (342) | OPERATING DAY COUNT [DAYS/MONTH] (343) | SHIFTS [SHIFTS/DAY] (344) | WORK TIME [MINUTES/SHIFT] (345) | BREAK TIME [MINUTES/SHIFT] (346) | OPERATION RATE [%] (347) |
|---|---|---|---|---|---|---|
| SITE A | 1 | 20 | 2 | 480 | 90 | 90 |
|  | 2 | 20 | 3 | 480 | 90 | 90 |
|  | 3 | 24 | 2 | 540 | 120 | 90 |
| SITE B | 1 | 24 | 2 | 480 | 90 | 95 |
|  | 2 | 24 | 2 | 540 | 120 | 95 |
| ⋮ | ⋮ | ⋮ | ⋮ | ⋮ | ⋮ | ⋮ |
| SITE X | 1 | 20 | 2 | 480 | 90 | 85 |

FIG. 7

UNIT COST INFORMATION 135

| PRODUCTION SITE (351) | SKILL LEVEL (352) | SKILL COEFFICIENT (353) | UNIT LABOR COST [YEN/MINUTE] (354) |
|---|---|---|---|
| SITE A | 1 | 1.2 | 100 |
|  | 2 | 1.1 | 120 |
|  | 3 | 1.0 | 140 |
| SITE B | 1 | 1.5 | 70 |
|  | 2 | 1.4 | 80 |
|  | 3 | 1.2 | 90 |
| ... | ... | ... | ... |
| SITE X | 1 | 1.3 | 80 |

350

| PRODUCTION SITE (356) | EQUIPMENT/INSTRUMENT TYPE (357) | SKILL COEFFICIENT (358) | EQUIPMENT/INSTRUMENT UNIT COST [YEN/UNIT] (359) |
|---|---|---|---|
| SITE A | ASSEMBLY EQUIPMENT A | 1.6 | 10,000,000 |
|  | ASSEMBLY EQUIPMENT B | 1.8 | 15,000,000 |
|  | WELDING EQUIPMENT | 1.4 | 15,000,000 |
|  | ... | ... | ... |
|  | TORQUE DRIVER | 1.0 | 500,000 |
|  | HAND | 1.2 | 200,000 |
|  | ... | ... | ... |
| SITE B | ASSEMBLY EQUIPMENT | 1.4 | 12,000,000 |
|  | WELDING EQUIPMENT A | 1.2 | 18,000,000 |
|  | WELDING EQUIPMENT B | 1.4 | 24,000,000 |
|  | ... | ... | ... |
| ... | ... | ... | ... |
| SITE X | ASSEMBLY EQUIPMENT | 1.0 | 20,000,000 |

STANDARD TASK TIME INFORMATION 136

| TASK TYPE | AUTOMATIC/MANUAL | TASK TIME |
|---|---|---|
| GRIP COMPONENT | AUTOMATIC | 4 [SECONDS/UNIT] |
|  | MANUAL | 2 [SECONDS/UNIT] |
| ASSEMBLE COMPONENT | AUTOMATIC | 4 [SECONDS/UNIT] |
|  | MANUAL | 3 [SECONDS/UNIT] |
| PRESS-FIT COMPONENT | AUTOMATIC | 6 [SECONDS/UNIT] |
|  | MANUAL | 8 [SECONDS/UNIT] |
| TIGHTEN SCREW | AUTOMATIC | 5 [SECONDS/UNIT] |
|  | MANUAL | 5 [SECONDS/UNIT] |
| RETIGHTEN SCREW | AUTOMATIC | 3 [SECONDS/UNIT] |
|  | MANUAL | 3 [SECONDS/UNIT] |
| ARC WELD | AUTOMATIC | 10 [SECONDS/M] |
|  | MANUAL | 10 [SECONDS/M] |
| SPOT WELD | AUTOMATIC | 4 [SECONDS/LOCATION] |
|  | MANUAL | 6 [SECONDS/LOCATION] |
| ... | ... | ... |
| VISUAL INSPECTION | AUTOMATIC | 2 [SECONDS/LOCATION] |
|  | MANUAL | 1 [SECONDS/LOCATION] |
| PRODUCT CONVEYANCE | AUTOMATIC | 6 [SECONDS/UNIT] |
|  | MANUAL | 4 [SECONDS/UNIT] |

*FIG. 9*

EQUIPMENT CONFIGURATION INFORMATION 137

| PRODUCTION SITE | EQUIPMENT TYPE | DIMENSIONS | PRODUCT CONVEYANCE | | COMPONENT SUPPLY | |
|---|---|---|---|---|---|---|
| | | | FORM | DIRECTION | NUMBER OF INVENTORY TYPES | DIRECTION |
| SITE A | ASSEMBLY EQUIPMENT | 1,200 X1,600 X2,000 | AUTOMATIC CONVEYOR | +X | 2 | +Y |
| | WELDING EQUIPMENT | 1,000 X1,800 X2,000 | AUTOMATIC CONVEYOR | +X | — | — |
| | COATING EQUIPMENT | 1,500 X2,400 X2,000 | AUTOMATIC CONVEYOR | +X | — | — |
| | ⋮ | ⋮ | ⋮ | ⋮ | ⋮ | ⋮ |
| | VISUAL INSPECTION EQUIPMENT | 800 X800 X1,800 | MANUAL INSERTION | -Y | — | — |
| | MANUAL WORKBENCH | 1,000 X1,000 X1,600 | MANUAL INSERTION | +X | 2 | +Y |
| SITE B | ⋮ | ⋮ | ⋮ | ⋮ | ⋮ | ⋮ |

*FIG. 10*

PRODUCTION CONDITION INFORMATION INPUT SCREEN

510

PRODUCT INFORMATION  (ADD PRODUCT)  511
- ■ PRODUCT A
- ■ PRODUCT B
- □ PRODUCT C

OPERATION INFORMATION  (ADD CONDITION)  512
- □ SITE A   CONDITION 1
- ■ SITE A   CONDITION 2
- □ SITE A   CONDITION 3
- ■ SITE B   CONDITION 1
- □ SITE B   CONDITION 2

WORKER INFORMATION  (ADD WORKER)  513
- □ SITE A   SKILL LEVEL 1   [   ] PERSON(S)
- ■ SITE A   SKILL LEVEL 2   [ 2 ] PERSON(S)
- ■ SITE A   SKILL LEVEL 3   [ 1 ] PERSON(S)
- ■ SITE B   SKILL LEVEL 1   [ 3 ] PERSON(S)
- ■ SITE B   SKILL LEVEL 2   [ 2 ] PERSON(S)
- □ SITE B   SKILL LEVEL 3   [   ] PERSON(S)

EQUIPMENT INFORMATION  (ADD EQUIPMENT)  514
- ■ SITE A   ASSEMBLY EQUIPMENT
- ■ SITE A   WELDING EQUIPMENT
- □ SITE A   COATING EQUIPMENT
- ■ SITE A   VISUAL INSPECTION EQUIPMENT
- ■ SITE B   ASSEMBLY EQUIPMENT
- ■ SITE B   WELDING EQUIPMENT
- □ SITE B   COATING EQUIPMENT
- □ SITE B   VISUAL INSPECTION EQUIPMENT (CANCEL)  (OK)

FIG. 12

OUTPUT SCREEN ~550

OPERATION INFORMATION   SITE A   CONDITION 2
WORKER INFORMATION   SKILL LEVEL 2   2   PERSON(S)
                     SKILL LEVEL 3   1   PERSON(S)
CYCLE TIME   50 SECONDS/UNIT

RESOURCE ALLOCATION

| PRODUCT | COMPONENT | ASSEMBLY SEQUENCE | ALLOCATION PROPOSAL 1 | | ALLOCATION PROPOSAL 2 | | ALLOCATION PROPOSAL 3 | |
|---|---|---|---|---|---|---|---|---|
| | | | RESOURCE | TIME | RESOURCE | TIME | RESOURCE | TIME |
| PRODUCT A | CASE | 1 | WORKER1 | 9 | WORKER1 | 5 | WORKER1 | 5 |
| | BLOCK | 2 | ASSEMBLY EQUIPMENT1 | 8 | WORKER1 | 5 | WORKER1 | 5 |
| | SCREW11 | 3 | ASSEMBLY EQUIPMENT1 | 9 | WORKER1 | 7 | WORKER1 | 7 |
| | SCREW12 | 4 | ASSEMBLY EQUIPMENT1 | 9 | WORKER1 | 11 | WORKER1 | 11 |
| | SCREW13 | 5 | ASSEMBLY EQUIPMENT1 | 15 | ASSEMBLY EQUIPMENT1 | 9 | WORKER2 | 9 |
| | SCREW14 | 6 | ASSEMBLY EQUIPMENT2 | 9 | ASSEMBLY EQUIPMENT1 | 9 | WORKER2 | 9 |
| | SUB ASSY A | 7 | ASSEMBLY EQUIPMENT2 | 8 | ASSEMBLY EQUIPMENT1 | 8 | WORKER2 | 6 |
| | SUB ASSY B | 8 | ASSEMBLY EQUIPMENT2 | 14 | ASSEMBLY EQUIPMENT1 | 14 | WORKER2 | 11 |
| | CABLE | 9 | WORKER1 | 5 | WORKER2 | 6 | WORKER3 | 9 |
| | SCREW31 | 10 | WORKER1 | 7 | WORKER2 | 9 | WORKER3 | 9 |
| | SCREW32 | 11 | WORKER1 | 11 | WORKER2 | 13 | WORKER3 | 13 |
| | (WELDING) | 12 | WELDING EQUIPMENT1 | 46 | WELDING EQUIPMENT1 | 46 | WELDING EQUIPMENT1 | 46 |
| | COVER | 13 | ASSEMBLY EQUIPMENT3 | 8 | WORKER2 | 11 | WORKER3 | 11 |
| | SCREW41 | 14 | ASSEMBLY EQUIPMENT3 | 9 | ASSEMBLY EQUIPMENT2 | 9 | ASSEMBLY EQUIPMENT1 | 9 |
| | SCREW42 | 15 | ASSEMBLY EQUIPMENT3 | 9 | ASSEMBLY EQUIPMENT2 | 9 | ASSEMBLY EQUIPMENT1 | 9 |
| | SCREW43 | 16 | ASSEMBLY EQUIPMENT3 | 9 | ASSEMBLY EQUIPMENT2 | 9 | ASSEMBLY EQUIPMENT1 | 9 |
| | SCREW44 | 17 | ASSEMBLY EQUIPMENT3 | 15 | ASSEMBLY EQUIPMENT2 | 15 | ASSEMBLY EQUIPMENT1 | 15 |

CANCEL   OK

*FIG. 13*

OUTPUT SCREEN  630

OPERATION INFORMATION    SITE A  CONDITION 2

PRODUCT INFORMATION    ◉ PRODUCT A
                                                     ○ PRODUCT B

RESOURCE ALLOCATION    ◉ ALLOCATION PROPOSAL 1
                                                     ○ ALLOCATION PROPOSAL 2
                                                     ○ ALLOCATION PROPOSAL 3

| ASSEMBLY EQUIPMENT1 | ASSEMBLY EQUIPMENT2 | ASSEMBLY EQUIPMENT3 |

```
 1  MOVE P0;
 2  MOVE P1;
 3  MOVE P2;
 4  HAND1_CHUCK;     // ATTACH HAND FOR BLOCK
 5  MOVE P1;
 6  MOVE P3;
 7  MOVE P4;
 8  AIRVALVE_ON;     // PICK OF BLOCK
 9  MOVE P3;
10  MOVE P5;
11  MOVE P6;
12  AIRVALVE_OFF;    // PLACE OF BLOCK
13  MOVE P5;
14  MOVE P1;
15  MOVE P2;
16  HAND1_UNCHUCK;   // DETACH HAND FOR BLOCK
17  MOVE P1;
18  MOVE P7;
19  MOVE P8;
20  DRIVER1_CHUCK;   // ATTACH DRIVER FOR SCREWS
21  MOVE P7;
22  MOVE P9;
23  MOVE P10;
24  AIRVALVE_ON;     // PICK OF SCREW11
25  MOVE P9;
26  MOVE P11;
```

[ CANCEL ]  [ OK ]

FIG. 19

LINE CONFIGURATION PLANNING DEVICE

CLAIM OF PRIORITY

The present application claims priority from Japanese patent application JP2020-066127 filed on Apr. 1, 2020, the content of which is hereby incorporated by reference into this application.

BACKGROUND ART

The present disclosure relates to a line configuration planning device.

JP 2009-142949 A (Patent Document 1) is background art of this disclosure. JP 2009-142949 A indicates that "This production system 1 includes a plurality of function cells FC that are constituted of person cells and robot cells, which are areas where assembly or machining is performed on a to-be-assembled item conveyed by a carrying conveyor 3, the functions of the function cells FC or the arrangement of automatic machines A, B, etc. disposed in the function cells FC being changed in order to handle fluctuations in production volume flexibly and with ease without decreasing the operation rate of the function cells FC. An allocation determination device 2 selects the automatic machines A, B, etc. having mechanical characteristics in which the time required for assembly or machining is known such that the operation times of the function cells FC are made uniform, and allocates the selected automatic machines A, B, etc. to the function cells FC according to input of the number of robot cells RC1, the number of person cells MC for which the number of people per person cell is set, etc." (see abstract).

SUMMARY

Amid a decrease in the number of production workers, it is becoming increasingly difficult to create production line proposals based on the experience of production line designers. Also, it would not be easy for production line designers to derive an optimal line proposal that could handle mixed flow production and fluctuations in production volume. Thus, a method by which a relatively inexperienced production line designer could derive a suitable production line configuration in a short period of time is desired.

JP 2009-142949 A discloses allocating automatic machines to function cells such that the task times in the function cells are uniform, but does not disclose a method by which a device allocates tasks for product production to workers and automatic machines. In order to efficiently select a production line configuration, a technique by which a device automatically generates a suitable allocation proposal for automatic machines and workers is desired.

An aspect of the present invention is a line configuration planning device that determines a configuration of a production line, the line configuration planning device. The line configuration planning device includes one or more storage devices, and one or more processors. The one or more storage devices store operation information indicating an operating condition of a factory, equipment configuration information indicating a configuration of equipment including an automatic machine, task information indicating a task type to be executed on a constituent element of a product, task time information indicating a task time by a worker or the automatic machine associated with the task type, product configuration information indicating a configuration of a to-be-produced product, and production plan information indicating a production volume and production period of the to-be-produced product. The one or more processors determine a task sequence during production of the to-be-produced product and the task time by the worker or the automatic machine for each task on the basis of the task information and the task time information. The one or more processors determine a required cycle time for producing the to-be-produced product on the basis of the production plan information. The one or more processors generate, on the basis of the determined task sequence, task time, and required cycle time, an allocation proposal for the worker and the automatic machine such that an estimated cycle time for producing the to-be-produced product is less than or equal to the required cycle time. The one or more processors determine a production line configuration for the to-be-produced product on the basis of the allocation proposal and the equipment configuration information.

According to a representative example of the present invention, it is possible to efficiently allocate tasks to workers and automatic machines on a production line. Problems, configurations, and effects other than what was described above are made clear by the description of embodiments below.

BRIEF DESCRIPTION OF THE DRAWINGS

FIG. 3 shows a configuration example of the product configuration information.

FIG. 6 shows a configuration example of automatic machine task information.

FIG. 7 shows a configuration example of the operation information.

FIG. 8 shows a configuration example of the unit cost information.

FIG. 9 shows a configuration example of the standard task time information.

FIG. 10 shows a configuration example of equipment configuration information.

FIG. 12 shows an example of a GUI (graphical user interface) screen for inputting production condition information displayed by the output unit in the output device.

FIG. 13 shows an output screen indicating the resources for the plurality of allocation proposals and the task times for the resources.

FIGS. 19 and 20 show examples of information of jobs performed by automatic machines and task instructions to workers of the allocation proposal, which are presented to the user via the output device by the output unit.

DETAILED DESCRIPTION OF THE PREFERRED EMBODIMENTS

Figure 1:
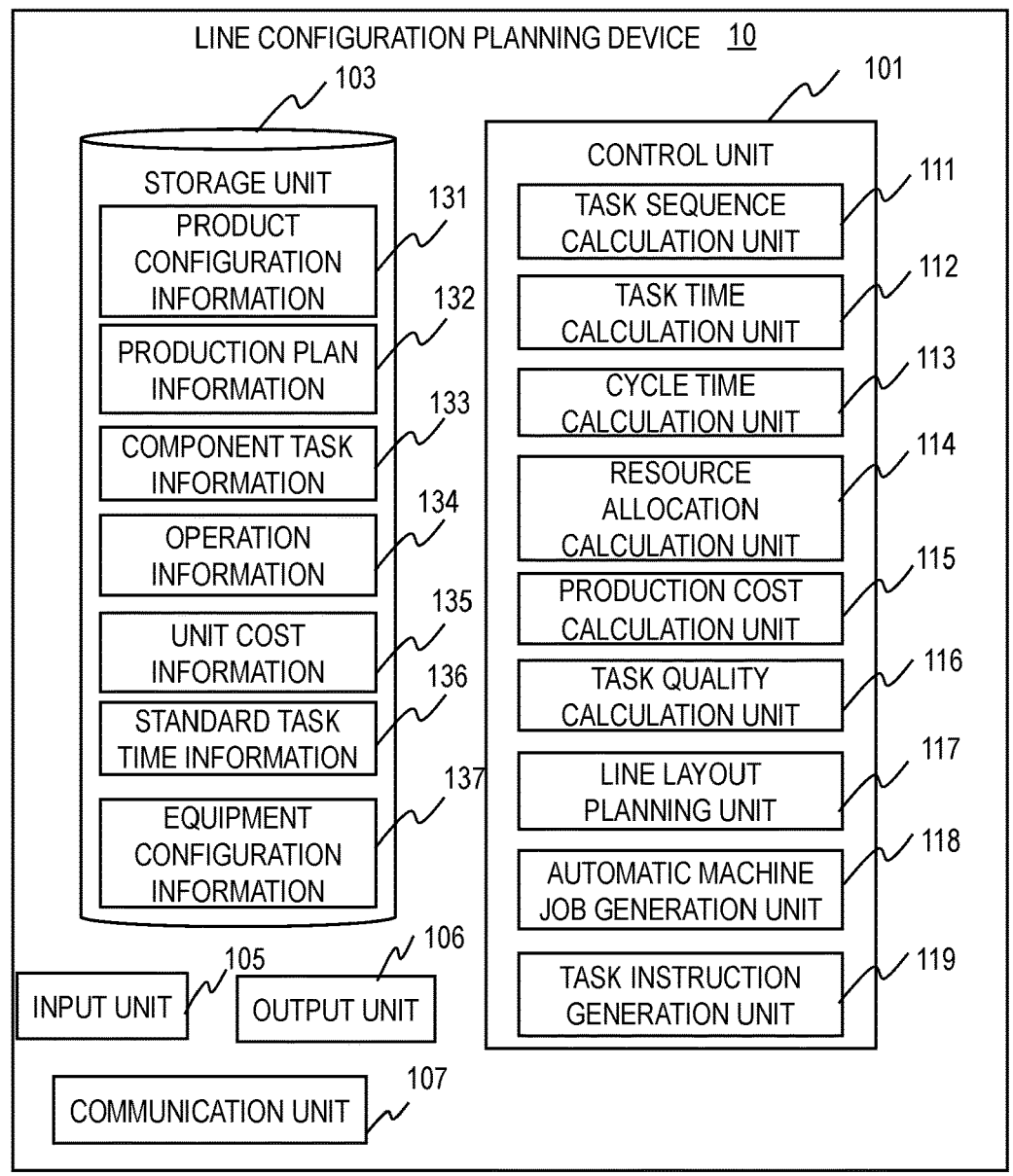
FIG. 1 shows a logic configuration example of a line configuration planning device.

Embodiments will be described below with reference to drawings. In the embodiments described below, same or similar configurations or functions are assigned the same reference characters, and redundant explanations thereof are omitted. Below, a method by which a resource allocation proposal for a production line is automatically generated by a line configuration planning device is described. The line configuration planning device can generate a suitable production line configuration proposal for a production line in which workers and automatic machines work cooperatively with each other, on the basis of the product configuration, production plan, and operating conditions in the factory. As a result, it is possible to generate a configuration proposal for a new production line for a new product or a line configuration modification proposal for producing a new product in an existing line.

Additionally, the line configuration planning device calculates the cost of the resource allocation proposal for the production line from information regarding labor and equipment costs, thereby allowing for the more suitable resource allocation proposal from a cost perspective to be selected. Also, the line configuration planning device calculates the task quality resulting from a given resource allocation proposal for the production line from information regarding the capabilities of the workers and equipment, thereby allowing for the more suitable resource allocation proposal from a task quality perspective to be selected.

Embodiment 1

FIG. 1 shows a logic configuration example of a line configuration planning device 10. The line configuration planning device 10 includes a control unit 101, a storage unit 103, an input unit 105, an output unit 106, and a communication unit 107. The control unit 101 executes various processes for generating a line layout for producing a product.

The storage unit 103 stores information (data) to be referred to or processed by the control unit 101. The input unit 105 can receive input of information by a user, and the output unit 106 presents information to the user. The information is presented by displaying images, for example. The communication unit 107 transmits and receives data to/from other devices via a network (not shown).

The control unit 101 includes a task sequence calculation unit 111, a task time calculation unit 112, a cycle time calculation unit 113, a resource allocation calculation unit 114, a production cost calculation unit 115, a task quality calculation unit 116, a line layout planning unit 117, an automatic machine job generation unit 118, and a task instruction generation unit 119. The operations of these functional units will be described later. The storage unit 103 stores product configuration information 131, production plan information 132, component task information 133, operation information 134, unit cost information 135, standard task time information 136, and equipment configuration information 137. Details regarding the information stored in the storage unit 103 will be described later.

Figure 2:
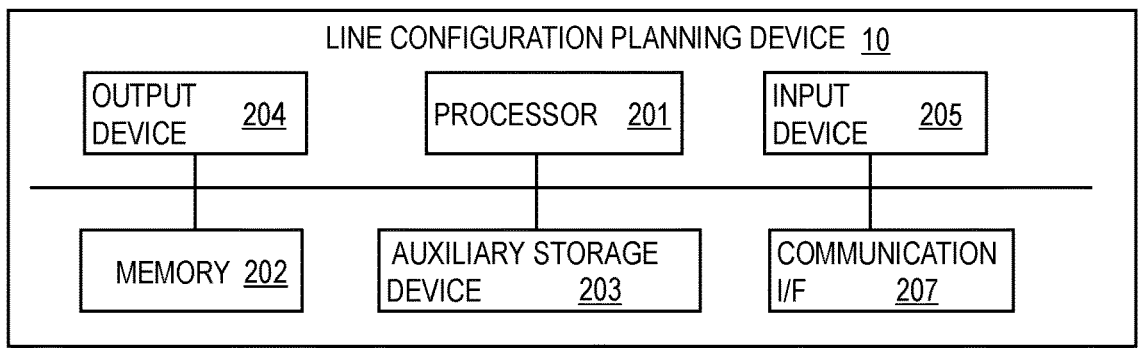
FIG. 2 shows a hardware configuration example of the line configuration planning device.

FIG. 2 shows a hardware configuration example of the line configuration planning device 10. The line configuration planning device 10 can have a typical computer configuration. The line configuration planning device 10 includes a processor 201, a memory (primary storage device) 202, an auxiliary storage device 203, an output device 204, an input device 205, and a communication interface (I/F) 207. These constituent elements are connected to each other by a bus. The memory 202, the auxiliary storage device 203, or a combination thereof is a storage device, and is an example of the storage unit 103 shown in FIG. 1.

The memory 202 is constituted of a semiconductor memory, for example, and is primarily used to store programs currently being executed and data. The processor 201 executes various processes according to programs stored in the memory 202. Various functional units are realized as a result of the processor 201 operating according to the programs. The control unit 101, the input unit 105, the output unit 106, and the communication unit 107 shown in FIG. 1 can be realized by the processor 201, for example.

The auxiliary storage device 203 is constituted of a large capacity storage device such as a hard disk drive or a solid state drive, and is used for long-term storage of programs and data. A software module may be stored in any region of the storage device.

The processor 201 can be constituted of one or more processing units, and can include one or more computation units or a plurality of processing cores. The processor 201 can have installed therein one or more central processing units, a microprocessor, a microcomputer, a microcontroller, a digital signal processor, a state machine, a logic circuit, a graphics processing unit, a system-on-a-chip, and/or a given device that operates signals on the basis of a control instruction.

The programs and data stored in the auxiliary storage device 203 are loaded to the memory 202 during start up or as necessary, and the programs are executed by the processor 201, thereby causing the various processes of the line configuration planning device 10 to be executed.

The processor 201 functions as specific functional units by operating according to specific programs. The processor 201 functions as the task sequence calculation unit 111, the task time calculation unit 112, the cycle time calculation unit 113, the resource allocation calculation unit 114, the production cost calculation unit 115, the task quality calculation unit 116, the line layout planning unit 117, the automatic machine job generation unit 118, and the task instruction generation unit 119, according to the respective corresponding programs. Thus, the processes executed by the functional units below are processes by the processor 201 or the programs.

The input device 205 is a hardware device for the user to input instructions and information to the line configuration planning device 10. The output device 204 is a hardware device for presenting various images for input and output, and is a display device or a printing device, for example. The communication I/F 207 is an interface for connecting to the network. The input device 205 and the output device 204 may be omitted, in which case the line configuration planning device 10 may be accessed from a terminal via a network.

The input unit 105 acquires user input information via the input device 205. The output unit 106 presents information to the user through the output device 204 (e.g., a display device). The communication unit 107 transmits/receives information with other devices via the communication I/F 207.

The functions of the line configuration planning device 10 can be installed in a computer system constituted of one or more computers including one or more processors and one or more storage devices that include a non-transitory storage medium. The plurality of computers communicate via the network. A configuration may be adopted in which some of a plurality of functions of the line configuration planning device 10 are installed in one computer and other functions are installed in another computer.

Below, information retained in the line configuration planning device 10 will be described. Information will be expressed below in tabular format, but the line configuration planning device 10 can retain necessary information in any format.

FIG. 3 shows a configuration example of the product configuration information 131. The product configuration information 131 is information regarding the configuration of a product to be produced. The product configuration information 131 is inputted by a user creating a line configuration plan via the input device 205 (input unit 105), and is stored in the auxiliary storage device 203 (storage unit 103), for example. In the example of FIG. 3, the product configuration information 131 indicates information for each component (constituent element) constituting a product. In the example of FIG. 3, the product configuration information 131 includes a product column 311, a component column 312, a component type column 313, a dimension column 314, a shape column 315, and a position/orientation column 316.

FIG. 3 indicates the product configuration information in tabular format, but as another example, the product configuration information may be extracted from 3-dimensional CAD data. 3-dimensional CAD data includes detailed information regarding the configuration of the product, and it would be possible to easily acquire sufficient product configuration information necessary for a production line configuration plan from the 3-dimensional CAD data.

The product column 311 indicates an identifier of the product. The component column 312 indicates an identifier of each component constituting the product indicated in the product column 311. The component type column 313 indicates the type of each component indicated in the component column 312. The dimension column 314 indicates the dimensions of each component indicated in the component column 312. The shape column 315 indicates the shape of each component indicated in the component column 312. The position/orientation column 316 indicates the position and orientation within the product of each component indicated in the component column 312. The position and orientation can be expressed as 3-dimensional coordinates in a prescribed space.

Figure 4:
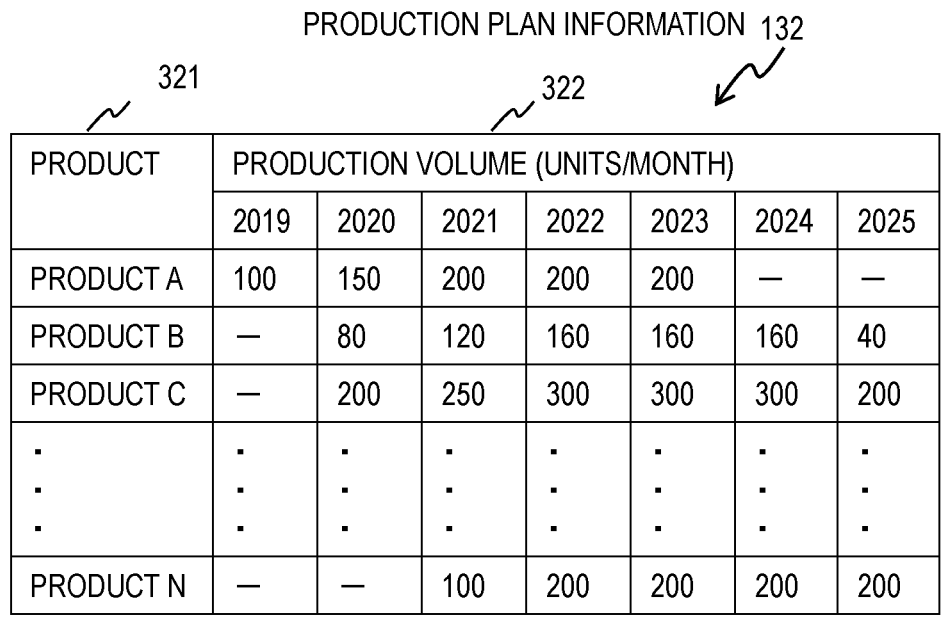
FIG. 4 shows a configuration example of the production plan information.

FIG. 4 shows a configuration example of the production plan information 132. The production plan information 132 indicates the production plan of a to-be-produced product. The production plan information 132 is inputted by a user creating a line configuration plan via the input device 205 (input unit 105), and is stored in the auxiliary storage device 203 (storage unit 103), for example. In the example of FIG. 4, the production plan information indicates the production count and production period of the product. Specifically, the production plan information 132 includes a product column 321 and a production volume column 322. The product column 321 indicates an identifier of the to-be-produced product. The production volume column 322 indicates the planned production volume for each product indicated in the product column 321. In the example of FIG. 4, the production volume column 322 indicates the planned production volume per month of each year.

Figure 5:
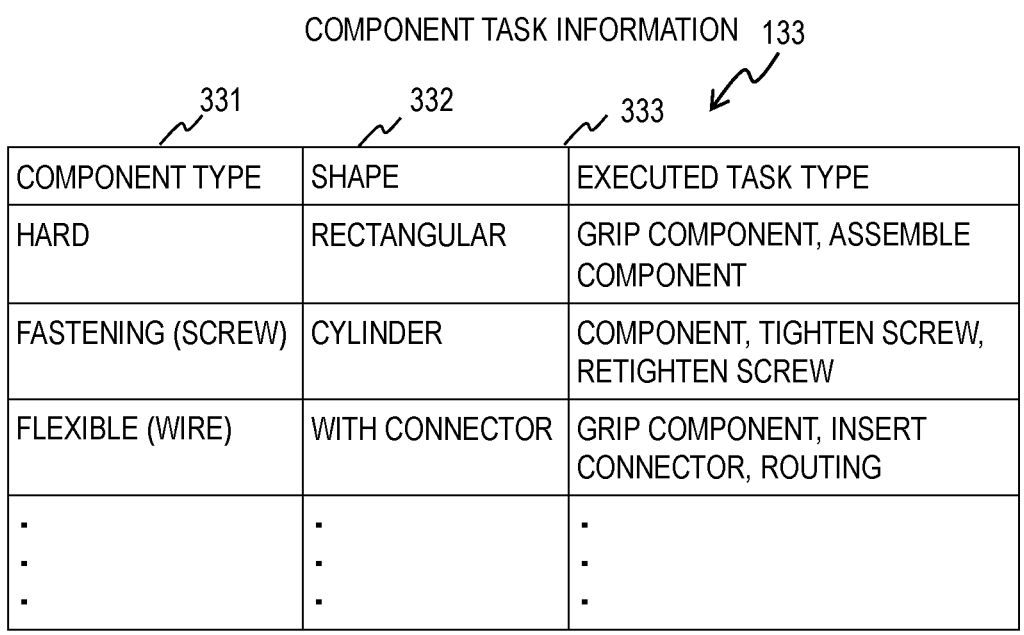
FIG. 5 shows a configuration example of the component task information.

FIG. 5 shows a configuration example of the component task information 133. The component task information 133 indicates tasks performed on a component in producing a product. One or more tasks are performed on each component. The component task information 133 is stored in the auxiliary storage device 203 (storage unit 103), for example. In the example of FIG. 5, the component task information 133 includes a component type column 331, a shape column 332, and an executed task type column 333. The component type column 331 indicates the type of component and the shape column 332 indicates the shape of the component. The executed task type column 333 indicates the combination and execution sequence of task types to be executed according to the combination of component type and shape.

FIG. 6 shows a configuration example of automatic machine task information 138. The automatic machine task information 138 indicates tasks executable by an automatic machine. Each automatic machine can execute one or more tasks. The automatic machine task information 138 includes an automatic machine type column 381 and an executable task type column 382. The automatic machine type column 381 indicates the type of automatic machine. The executable task type column 382 indicates tasks executable by the type of automatic machine indicated in the automatic machine type column 381. This information is referred to in order to determine which automatic machine can be allocated to a given task executed during production of the product.

FIG. 7 shows a configuration example of the operation information 134. The operation information 134 indicates operating conditions of a site where a product is to be produced. The operation information 134 is stored in advance in the auxiliary storage device 203 (storage unit 103), for example. In the example shown in FIG. 7, the operation information 134 includes a production site column 341, an operating condition column 342, an operating day count column 343, a shift column 344, a work time column 345, a break time column 346, and an operation rate column 347.

The production site column 341 indicates an identifier of the production site. The operating condition column 342 indicates an identifier of operating conditions that could be adopted at each production site indicated in the production site column 341. The operating day count column 343 indicates the number of operating days per month under each operating condition at each production site. The shift column 344 indicates the number of shifts per day under each operating condition at each production site.

The work time column 345 indicates the amount of work time per shift. The break time column 346 indicates the amount of break time per shift. The operation rate column 347 indicates the operation rate under each operating condition at each production site. The operation rate indicates the ratio of the estimated actual operation time in relation to the nominal operation time calculated from information in the other columns. The estimated actual operation time is used in calculating the required cycle time in the production line configuration plan mentioned later and the estimated cycle time of a proposed production line allocation plan.

FIG. 8 shows a configuration example of the unit cost information 135. The unit cost information is referred to in calculating the task time and task quality mentioned later. The unit cost information 135 is stored in advance in the auxiliary storage device 203 (storage unit 103), for example. The unit cost information 135 includes information 350 indicating the unit cost of the workers and information 355 indicating the unit cost of equipment and instruments.

The unit cost information 350 for the workers includes a production site column 351, a skill level column 352, a skill coefficient column 353, and a unit labor cost column 354. The production site column 351 indicates an identifier of the production site. The skill level column 352 indicates identifiers of skill levels that can be allocated to workers at each production site. The skill level indicates the capabilities of the worker.

The skill coefficient column 353 indicates a coefficient associated with each skill level indicated by the skill level column 352 at each production site. The skill coefficient is a coefficient used in calculating the task time and the task quality by workers to be mentioned later. It is considered that the higher the skill level is, the higher the quality of the task is and the shorter the task time is. The unit labor cost column 354 indicates the unit labor cost associated with each skill level indicated by the skill level column 352 at each production site. In the example of FIG. 7, the unit labor cost is indicated as the labor cost per minute (yen/minute).

The unit cost information 135 for the equipment and instruments includes a production site column 356, an equipment/instrument type column 357, a skill coefficient column 358, and an equipment/instrument unit cost column 359. The production site column 355 indicates an identifier of the production site. The equipment/instrument type column 357 indicates the equipment and instruments that can be used at each production site. The equipment refers to devices installed on the factory floor, and includes automatic machines that execute tasks automatically in place of workers, manual workbenches for use by workers to perform tasks, and the like. The instruments indicated by the unit cost information 135 include instruments used by the automatic machines or instruments used by workers. Such instruments may be fixed to the equipment or used manually by workers, for example.

The skill coefficient column 358 indicates a coefficient associated with each equipment type and instrument type at each production site. The skill coefficient of the equipment is a coefficient regarding the capabilities of the equipment, and is a coefficient used in calculating the task time and the task quality by an automatic machine or by workers using the equipment. The skill coefficient of the instruments is a coefficient used in calculating the task time and the task quality by automatic machines or workers using the instruments. It is considered that the higher the skill level is, the higher the quality of the task is and the shorter the task time is. The equipment/instrument unit cost column 359 indicates the unit cost associated with each equipment/instrument type indicated in the equipment/instrument type column 357 of each production site. In the example of FIG. 8, the unit cost for each equipment/instrument type is indicated as the cost per unit (yen/unit).

FIG. 9 shows a configuration example of the standard task time information 136. The standard task time information 136 indicates the standard task times of workers and automatic machines. The standard task time information 136 is stored in advance in the auxiliary storage device 203 (storage unit 103), for example. The task times of the workers and the automatic machines are calculated on the basis of the standard task time and the skill coefficient.

In the example of FIG. 9, the standard task time information 136 includes a task type column 365, an automatic/manual column 366, and a task time column 367. The task type column 365 indicates the type of task in producing a product. The automatic/manual column 366 indicates whether each entry is a task to be performed by an automatic machine (automatic) or a task to be performed by a worker (manual). The task type column 365 indicates the standard task time for when each task is executed by an automatic machine or a worker.

FIG. 10 shows a configuration example of equipment configuration information 137. The equipment configuration information 137 indicates the configuration of each equipment type, and is referred to when designing the production line layout (equipment layout). The equipment configuration information 137 is stored in advance in the auxiliary storage device 203 (storage unit 103), for example. In the example of FIG. 10, the equipment configuration information 137 includes a production site column 371, an equipment type column 372, a dimension column 373, a product conveyance column 374, and a component supply column 375.

The production site column 371 indicates an identifier of each production site. The equipment type column 372 indicates the type of equipment at each production site. In FIG. 10, the assembly equipment, the welding equipment, the coating equipment, and the visual inspection equipment are examples of automatic machines. The manual workbench is an example of an item other than the automatic machine, and is a workbench used by a worker. The dimension column 373 indicates the dimensions of each equipment type indicated in the equipment type column 372 of each production site.

The product conveyance column 374 indicates the direction in which the product being produced is conveyed from the previous step for each equipment type indicated in the equipment type column 372 of each production site. The product conveyance column 374 additionally indicates the conveyance form. The component supply column 375 indicates the component supply direction of each equipment type indicated in the equipment type column 372 of each production site. The components attached to the product by the equipment are supplied to the equipment in the component supply direction.

The component supply column 375 additionally indicates the number of inventory types. The number of inventory types indicates the number of component types that can be accommodated by the equipment as inventory. In creating a production line layout proposal, the positional relationship between the equipment and other equipment and the orientation of the equipment are limited by the conveyance of the product to and from the equipment as well as the component supply direction.

FIG. 10 indicates the equipment configuration information in tabular format, but as another example, the equipment configuration information may be extracted from 3-dimensional CAD data. 3-dimensional CAD data includes detailed information regarding the configuration of the equipment, and it would be possible to easily acquire sufficient equipment configuration information necessary for a production line configuration plan from the 3-dimensional CAD data.

Figure 11:
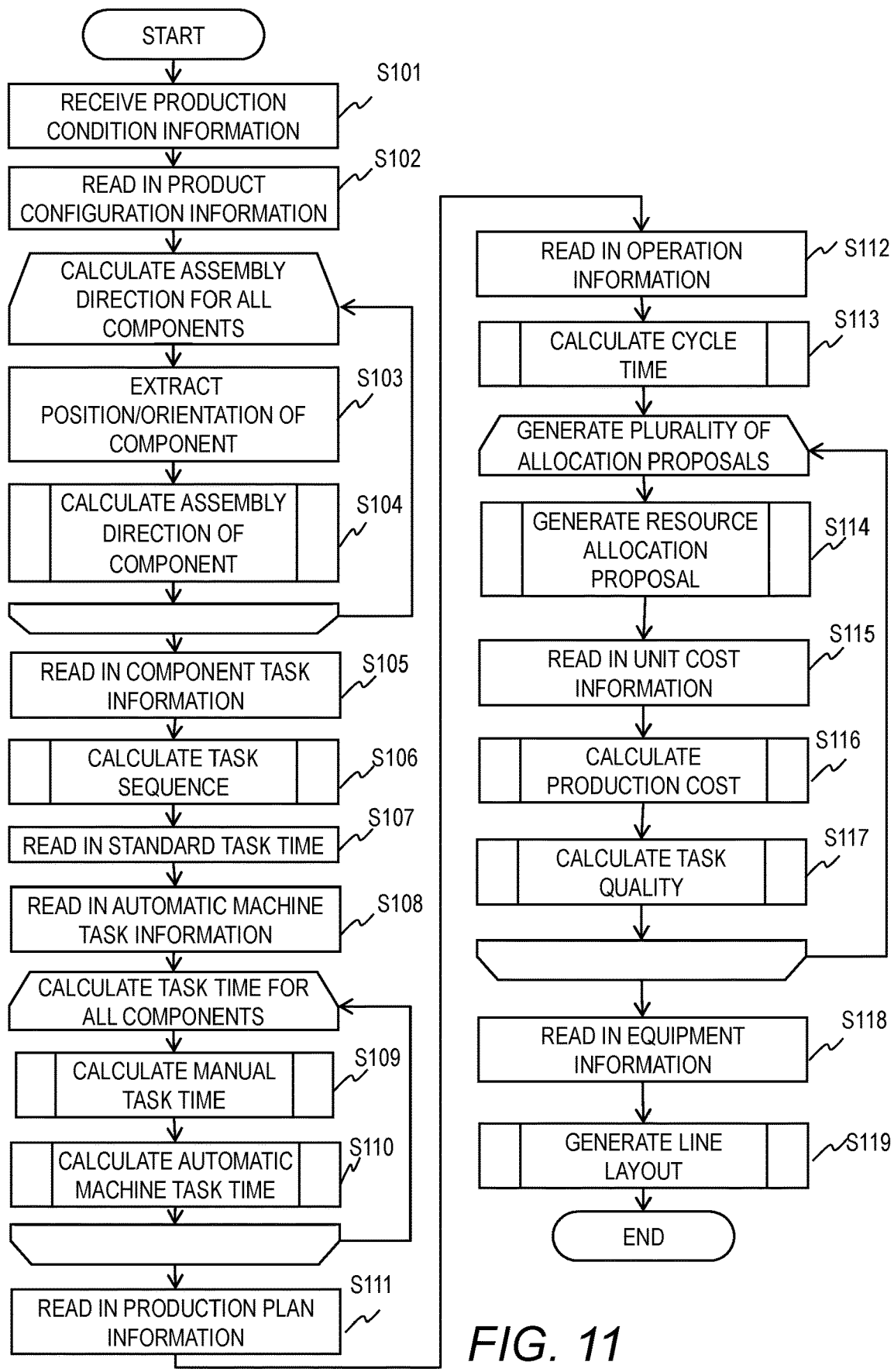
FIG. 11 shows a flowchart of a process example executed by the line configuration planning device.

FIG. 11 shows a flowchart of a process example executed by the line configuration planning device 10. FIG. 11 shows an example of a process for planning a line configuration for producing one type of product. First, the line configuration planning device 10 receives input from the user of production conditions for generating a production line configuration proposal (S101).

FIG. 12 shows an example of a GUI (graphical user interface) screen 510 for inputting production condition information displayed by the output unit 106 in the output device 204. The input unit 105 stores, in the storage unit 103, the production condition information inputted via the input unit 205.

In the example of FIG. 12, the production condition information input screen 510 includes a plurality of sections 511 to 514 designating the production conditions. The product information section 511 receives designation of the to-be-produced product. As described above, in this flow, a product line configuration proposal for designated products A and B is created.

The operating condition section 512 receives designation of the production site and operating conditions for generating the production line configuration proposal. The operating conditions are indicated by the operation information 134. In the example of FIG. 12, a production site A under an operating condition 2 and a production site B under an operating condition 1 are designated.

The worker section 513 receives designation of worker conditions in the production line. In the example of FIG. 12, the user designates an upper limit to the number of workers having each skill level at each production site. The number of people actually working at the production may be designated instead of the upper limit. For example, at the production site A, the upper limit to the number of workers at a skill level of 1 is 0, the upper limit to the number of workers at a skill level of 2 is 2, and the upper limit to the number of workers at a skill level of 3 is 1.

The equipment information section 514 receives designation of the type of equipment installed on the production line at each production site. In the example described below, there is no limitation to the number of pieces of designated equipment installed, and a configuration may be adopted in which an upper limit value can be set, for example.

Returning to FIG. 11, next, the task sequence calculation unit 111 reads in product configuration information of one to-be-produced product designated in the product information section 511, from the product configuration information 131 stored in the storage unit 103 (S102).

Next, the task sequence calculation unit 111 sequentially calculates the assembly direction of each of all components of the to-be-produced product on the basis of the product configuration information. Specifically, the task sequence calculation unit 111 extracts the position and orientation of the selected component from the position/orientation column 316 of the product configuration information (S103). Additionally, the task sequence calculation unit 111 calculates the assembly direction of the selected component according to the position and orientation of the component (S104).

Next, the task sequence calculation unit 111 reads in the component task information 133 from the storage unit 103 (S105). Also, the task sequence calculation unit 111 calculates the task sequence (S106). Specifically, the task sequence calculation unit 111 determines the assembly sequence of the components from information of the position and orientation of the components, and information of the assembly direction of the components calculated in step S103. With reference to the component task information 133, the task types of the respective components of the to-be-produced product are determined. The task sequence calculation unit 111 determines the task sequence in producing the product according to the assembly sequence for the components and the task type.

Next, the task time calculation unit 112 reads in the standard task time information 136 from the storage unit 103 (S107). Additionally, the task time calculation unit 112 reads in the automatic machine task information 138 from the storage unit 103 (S108).

Next, the task time calculation unit 112 sequentially calculates the estimated task time for each of all components of the to-be-produced product. First, the task time calculation unit 112 calculates the task time (manual task time) for a case in which tasks for the selected component are performed by a worker (S109). The worker is assumed to be able to execute any task.

Specifically, the task time calculation unit 112 extracts, from the standard task time information 136, the standard task time performed by a worker (manual standard task time) for each task for the selected component, and determines this standard task time as the manual standard task time for each task for the component. Additionally, the task time calculation unit 112 estimates the manual task time for each designated skill level for each task for the component on the basis of the skill level of the worker designated by the user and the skill coefficient indicated by the unit cost information 135. The manual task time for a skill level is a value attained by multiplying the manual standard task time by the skill coefficient of the skill level.

Additionally, the task time calculation unit 112 calculates the task time (automatic machine task time) for a case in which tasks for the selected component are performed by an automatic machine designated by the production condition information (S110). Specifically, the task time calculation unit 112 identifies the automatic machine to perform the tasks for the selected component among the automatic machines designated by the production condition information with reference to the automatic machine task information 138. If no automatic machine that can execute the task has been designated, then calculation of the automatic machine task time for the task is omitted.

The task time calculation unit 112 extracts, from the standard task time information 136, the standard task time performed by an identified automatic machine (automatic standard task time), and determines this standard task time as the automatic standard task time for each task for the component. Additionally, the task time calculation unit 112 estimates the automatic machine task time for each task on the basis of the skill coefficient indicated by the unit cost information 135. The estimated automatic machine task time is a value attained by multiplying the automatic machine standard task time by the skill coefficient of the automatic machine that executes the task.

Next, the cycle time calculation unit 113 reads in the production plan information 132 from the storage unit 103 (S111). Additionally, the cycle time calculation unit 113 reads in the operation information 134 from the storage unit 103 (S112).

Next, the cycle time calculation unit 113 calculates the required cycle time on the basis of the production plan information 132 and the operation information 134 (S113). The cycle time calculation unit 113 calculates the required cycle time of the product on the basis of the production plan for the year with the greatest production volume, for example.

The required cycle time is calculated according to the planned production count per month (unit period) and the operation time per month of the production line. The cycle time calculation unit 113 acquires the planned production count per month of a product according to the production plan information 132. The cycle time calculation unit 113 calculates the operation time per month for the production site and operating condition designated by the user (in the operating condition section 512), with reference to the operation information 134.

The operation time per month can be calculated in the following way, for example: Operation time (minutes/month)=(operating day count [days/month]*shift count [shifts/day]*(work time [minutes/shift]−break time [minutes/shift])*operation rate [%]). The required cycle time is a value attained by dividing the calculated operation time per month by the planned production count (operation time [minutes/month]/planned production count [units/month]).

Next, the resource allocation calculation unit 114 sequentially generates a plurality of resource allocation proposals (production line configuration proposals) for production lines at each designated production site. The resource allocation proposals indicate the workers and automatic machines to which the tasks to be sequentially executed are allocated in the production line. In generating each resource allocation proposal (S114), the upper limit values for workers at each skill level and automatic machine types that can be used as resources are designated in the production condition information as described above. The resource allocation proposals are generated so as to satisfy worker conditions and equipment conditions indicated by the production condition information.

The resource allocation calculation unit 114 generates the resource allocation proposals such that the estimated cycle time of each resource allocation proposal is less than or equal to the required cycle time calculated in step S110. The estimated cycle time corresponds to the maximum task time for each step executed by one automatic machine or worker. The task time for each step can be set as the time from when the item on which the task is to be performed is brought to each automatic machine or worker to when the item on which the task has been performed is conveyed out. The task time for each step can be calculated from the manual task time and the automatic machine task time.

Next, the production cost calculation unit 115 reads in the unit cost information 135 from the storage unit 103 (S115). The production cost calculation unit 115 calculates the production cost of each resource allocation proposal on the basis of the unit cost information 135 (S116). The production cost can be expressed as a cost per unit of product, for example. The labor cost of the worker can be calculated as the product of the estimated cycle time (minutes/unit) and the labor unit cost (yen/minute) of the worker. The cost of the equipment and instruments is a value attained by dividing the unit cost thereof (yen) by the total production count (units).

Next, the task quality calculation unit 116 calculates the task quality of a resource allocation proposal (S116). The task quality calculation unit 116 calculates the task quality of the resource allocation proposal on the basis of the skill coefficient indicated by the unit cost information 135. The task quality calculation unit 116 can set the product of the skill coefficients of resources as the task quality of the resource allocation proposal, for example.

The resource allocation calculation unit 114 can generate all resource allocation proposals so as to satisfy the user-designated worker conditions and equipment conditions as well as the estimated cycle time being less than or equal to the required cycle time. The production cost calculation unit 115 and the task quality calculation unit 116 can calculate the production cost and task quality of the resource allocation proposals. The information of the resource allocation proposals is stored in the storage unit 103.

The resource allocation calculation unit 114 may select, as the final allocation proposal from among all of the allocation proposals, the resource allocation proposal that satisfies the conditions in which the production cost and/or the task quality are set in advance. The resource allocation calculation unit 114 may select a prescribed number of resource allocation proposals starting with the proposal with the lowest production cost, among resource allocation proposals in which the task quality exceeds a threshold. Calculation of the production cost and/or the task quality may be omitted.

Next, the line layout planning unit 117 reads in the equipment configuration information 137 from the storage unit 103 (S118). The line layout planning unit 117 generates a line layout for each of the resource allocation proposals selected by the resource allocation calculation unit 114 on the basis of the equipment configuration information 137 (S119). The equipment has the same conveyance direction for the product as an adjacent piece of equipment, and is installed such that there are no objects blocking the supply of components in the component supply direction of the equipment. Also, the equipment is installed such that the products are conveyed in a suitable manner between adjacent pieces of equipment on the basis of the dimensions thereof. The generated line layout is stored in the storage unit 103.

An example of output information regarding allocation proposals for a production line configuration presented to the user via the output device 204 by the output unit 106 will be described with reference to FIGS. 13 to 16. The output screen 550 of FIG. 13 shows the resources for the plurality of allocation proposals and the task times for the resources. Specifically, the output screen 550 shows a production site designated by the user and resource configurations for a plurality of allocation proposals under the operating condition at the production site. In the example of FIG. 13, the output screen 550 shows three allocation proposals under an operating condition 2 at a production site A.

The output screen 550 also indicates the required cycle time determined according to information of the designated worker condition and the designated production condition. In the example of FIG. 13, the output screen 550 indicates, as worker information (worker conditions), that the upper limit to the number of workers at a skill level of 2 is two, the upper limit to the number of workers at a skill level of 3 is one, and no workers at other skill levels are allocated. The output screen 550 also indicates that the required cycle time is 50 seconds/unit.

An identifier of the to-be-produced product, components constituting each product, and the assembly sequence of the components are indicated. Additionally, the output screen 550 indicates the identifiers of the resources allocated to the components (or tasks related thereto) of each allocation proposal and the planned task time of each of the resources. Each resource is a worker or an automatic machine.

In this manner, by indicating the resources and task time of the allocation proposals, it is possible to aid the selection by the user of the allocation proposal to be executed. In addition to the content presented in the example of FIG. 13, the cost and/or task quality of each allocation proposal may be presented. These further aid the selection by the user of the allocation proposal to be executed.

Figure 14:
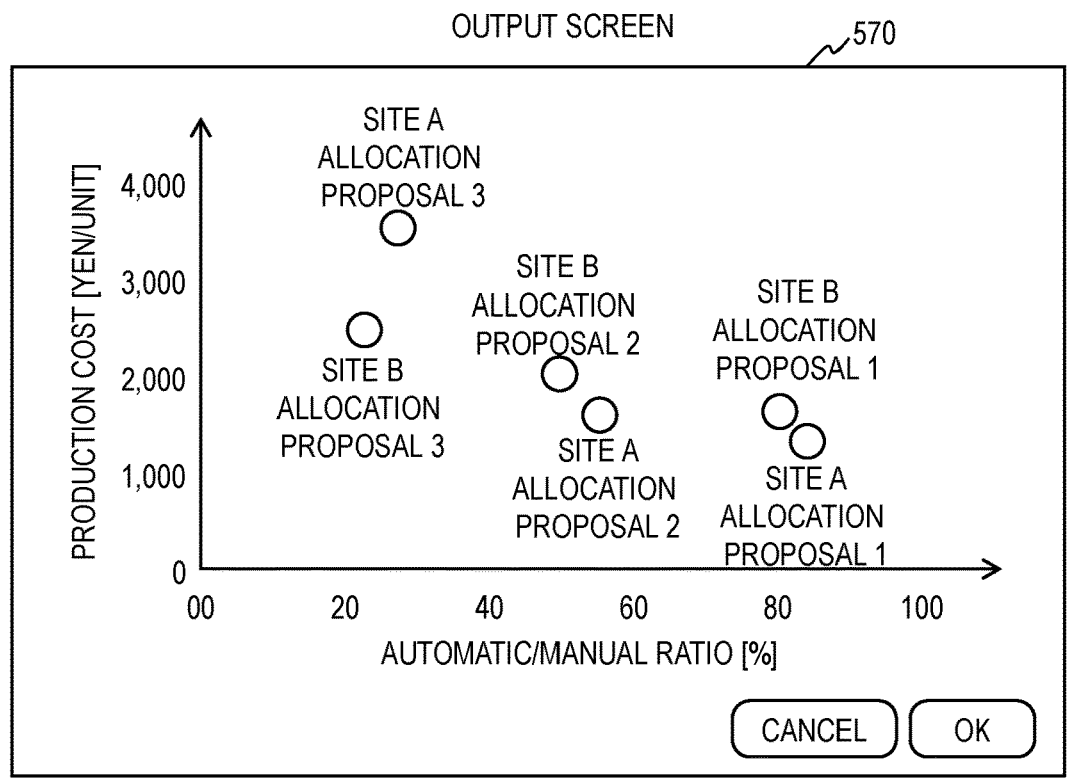
FIG. 14 shows an output screen indicating the production cost of each of the allocation proposals.

The output screen 570 of FIG. 14 indicates the production cost of each of the allocation proposals. The horizontal axis of the graph of the output screen 570 indicates the proportion of automatic machines among the resources for each allocation proposal, and the vertical axis indicates the production cost of each allocation proposal. If all tasks were performed by automatic machines, the value on the horizontal axis would be 100%. In the example of FIG. 14, the output screen 570 indicates information of three allocation proposals for each of the production sites A and B. By presenting the production costs of the allocation proposals to the user, it is possible to aid the selection by the user of the allocation proposal to be executed.

Figure 15:
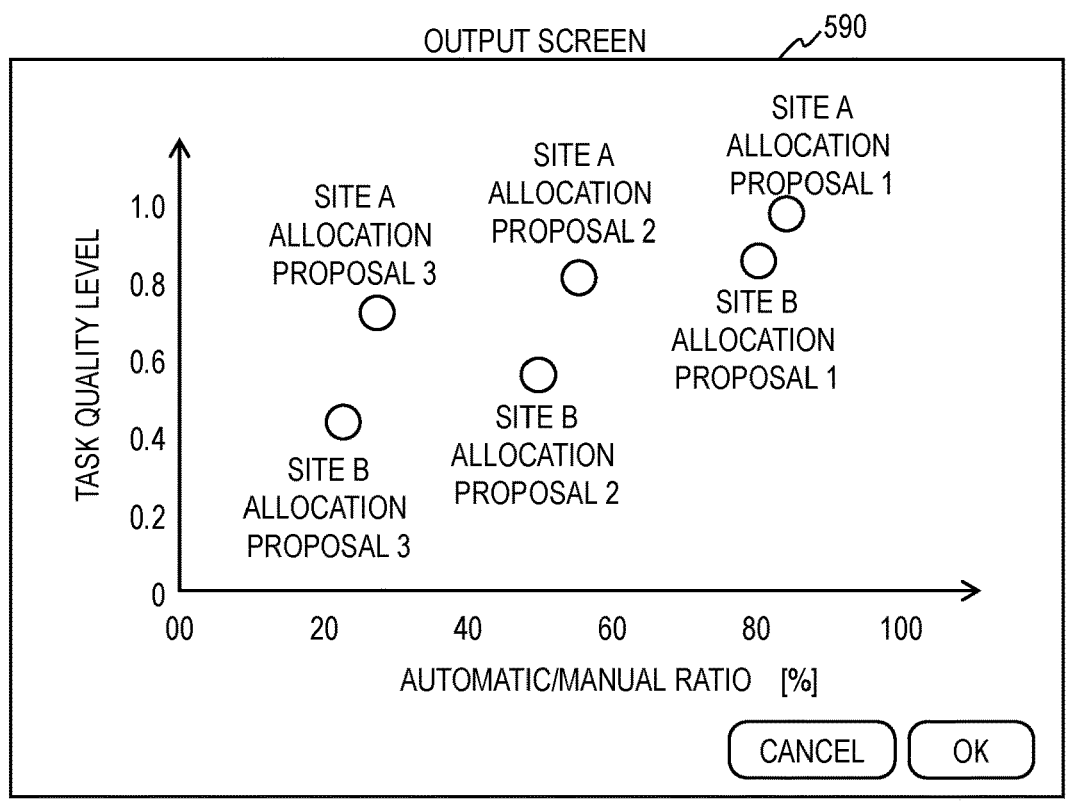
FIG. 15 shows an output screen indicating the task quality of each of the allocation proposals.

The output screen 590 of FIG. 15 indicates the task quality of each of the allocation proposals. The horizontal axis of the graph of the output screen 590 indicates the proportion of automatic machines among the resources for each allocation proposal, and the vertical axis indicates the task quality of each allocation proposal. If all tasks were performed by automatic machines, the value on the horizontal axis would be 100%. In the example of FIG. 15, the output screen 590 indicates information of three allocation proposals for each of the production sites A and B. By presenting the task quality of each of the allocation proposals to the user, it is possible to aid the selection by the user of the allocation proposal to be executed.

Figure 16:
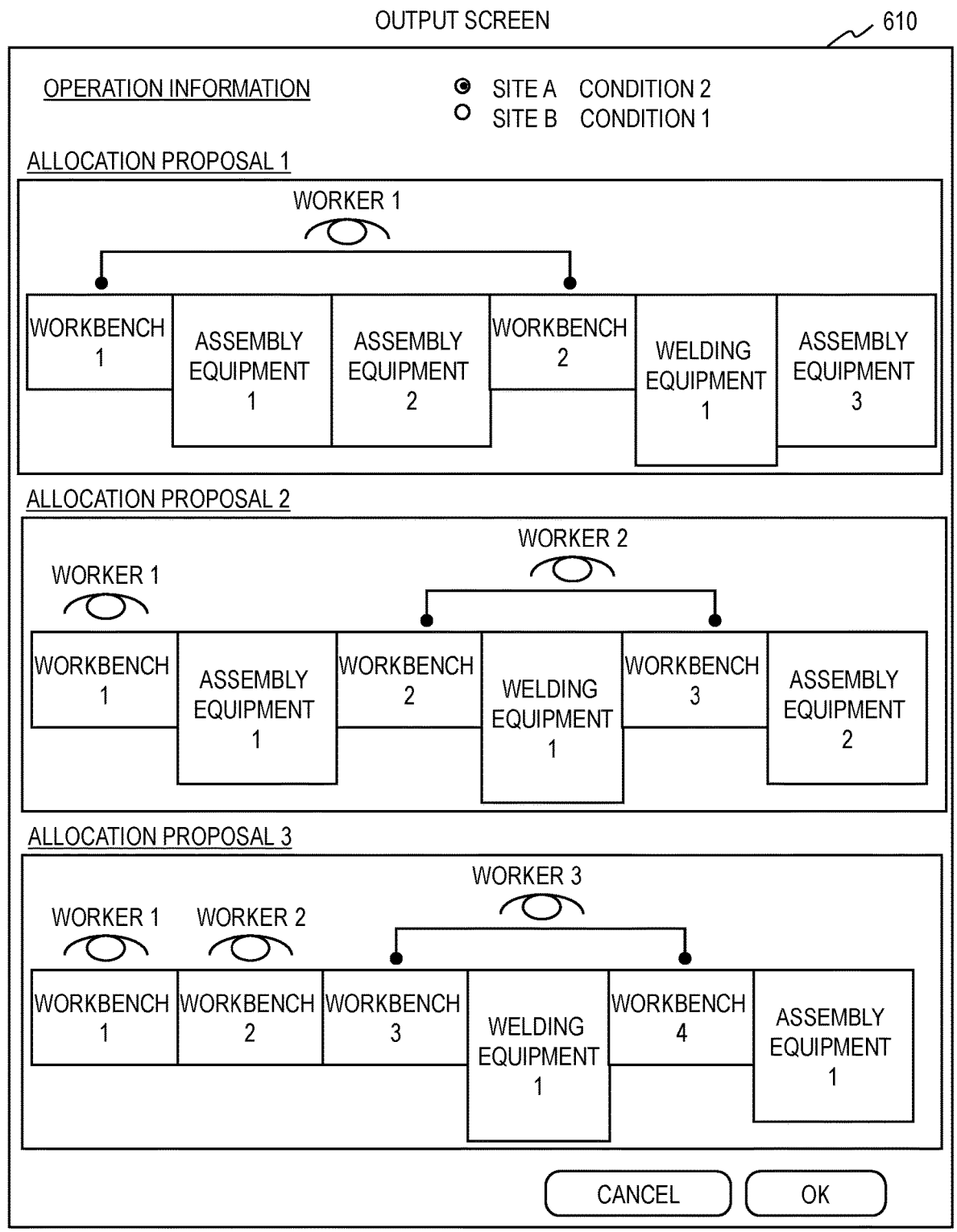
FIG. 16 shows an output screen indicating the production line layout of each of the allocation proposals.

The output screen 610 of FIG. 16 indicates the production line layout of each of the allocation proposals. In the example of FIG. 16, the output screen 610 indicates a schematic view of operation information of the displayed allocation proposals and the production line layout of the allocation proposals. The example of FIG. 16 shows production line layouts of three allocation proposals under the operating condition 2 at the production site A. The production line layout of each allocation proposal indicates the location of the workers and the equipment, and also indicates the skill levels of the workers and the types of equipment. By presenting the production line layouts of the allocation proposals to the user, it is possible to aid the selection by the user of the allocation proposal to be executed.

Figure 17:
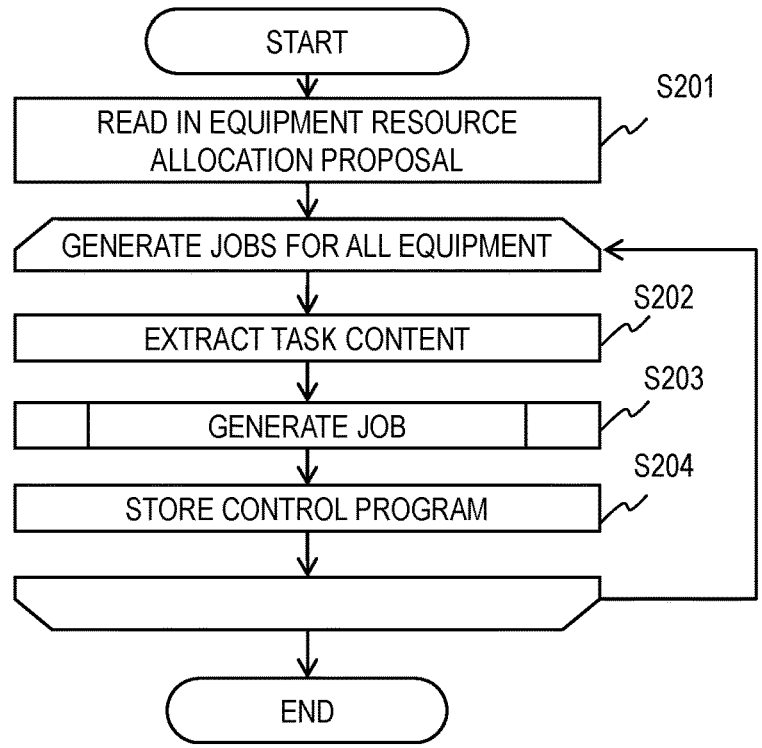
FIG. 17 shows a flowchart of a processing example of generating jobs (programs) to be installed in the automatic machines.

Below, a processing example for generating jobs (programs) installed in the automatic machines by the line configuration planning device 10 and generating task instructions to be presented to the workers will be described. Through these means, it is possible to generate jobs and task instructions efficiently. FIG. 17 shows a flowchart of a processing example of generating jobs (programs) to be installed in the automatic machines. The automatic machine job generation unit 118 generates the jobs. The automatic machines can be robots, processing machines, or the like.

With reference to FIG. 17, first, the automatic machine job generation unit 118 reads in information of equipment resources of an allocation proposal (S201). The automatic machine job generation unit 118 sequentially generates the jobs of all automatic machines (equipment) included in the allocation proposal. Specifically, the automatic machine job generation unit 118 extracts the task content of a selected automatic machine from the allocation proposal (S202).

Jobs (control programs) for executing each of the tasks are generated (S203). The automatic machine job generation unit 118 refers to the component task information 133 of the task content allocated to each automatic machine to generate jobs for the automatic machines to work. The automatic generation of jobs is a publicly known technique, and thus, a detailed explanation thereof is omitted here. The automatic machine job generation unit 118 stores the generated control program in the storage unit 103 (S204).

Figure 18:
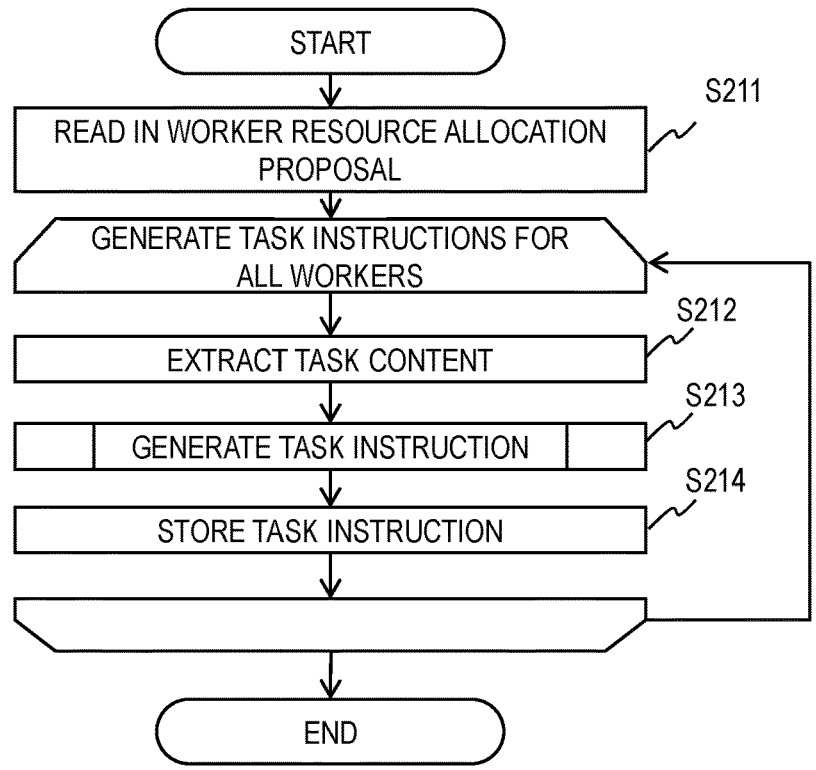
FIG. 18 shows a flowchart of a processing example of generating task instructions to be presented to the worker.

FIG. 18 shows a flowchart of a processing example of generating task instructions to be presented to the worker. The task instruction generation unit 119 generates task instructions. The task instruction generation unit 119 reads in information of worker resources of an allocation proposal (S211). The task instruction generation unit 119 sequentially generates task instructions for all workers included in the allocation proposal.

Specifically, the task instruction generation unit 119 extracts the task content of a selected worker from the allocation proposal (S212). The task instruction generation unit 119 generates task instructions for executing the task content (S213). The task instruction generation unit 119 can generate task instructions from information of all corresponding components of the product configuration information 131. The task instruction generation unit 119 can generate task instructions using an exploded view drawing including corresponding components in a 3D CAD of the product, for example. The task instruction generation unit 119 stores the generated task instructions in the storage unit 103 (S214).

Figure 20:
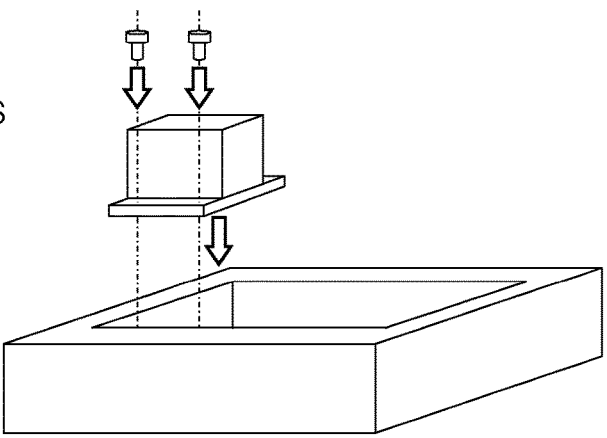

FIGS. 19 and 20 show examples of information of jobs performed by automatic machines and task instructions to workers of the allocation proposal, which are presented to the user via the output device 204 by the output unit 106. In FIG. 19, the output screen 630 indicates the selected operation information, products, and allocation proposals, and indicates a control program for each of the automatic machines (equipment) of each of the allocation proposals. FIG. 19 indicates, as an example, the job of the assembly equipment 1 of the allocation proposal 1 of the production line for the product A under the operating condition 2 at the production site A. By presenting the job of each of the allocation proposals to the user, it is possible to aid the selection by the user of the allocation proposal to be executed.

In FIG. 20, the output screen 650 indicates the selected operation information, products, and allocation proposals, and indicates a control program for each of the workers in each of the allocation proposals. FIG. 20 indicates, as an example, task instructions to a worker 1 in the allocation proposal 2 of the production line for the product A under the operating condition 2 at the production site A. By presenting the task instructions of each of the allocation proposals to the user, it is possible to aid the selection by the user of the allocation proposal to be executed. FIG. 20 shows an example of written task instructions, but video information that presents the task sequence may instead be generated.

As described above, a configuration may be adopted in which, by generating one or more allocation proposals and presenting information regarding the allocation proposals to the user, the user can select an allocation proposal applicable to the situation. As another example, a configuration may be adopted in which resource allocation applicable to a given situation is determined automatically by the line configuration planning device 10, and a job and written task instruction of the allocation proposal are generated.

Embodiment 2

Figure 21:
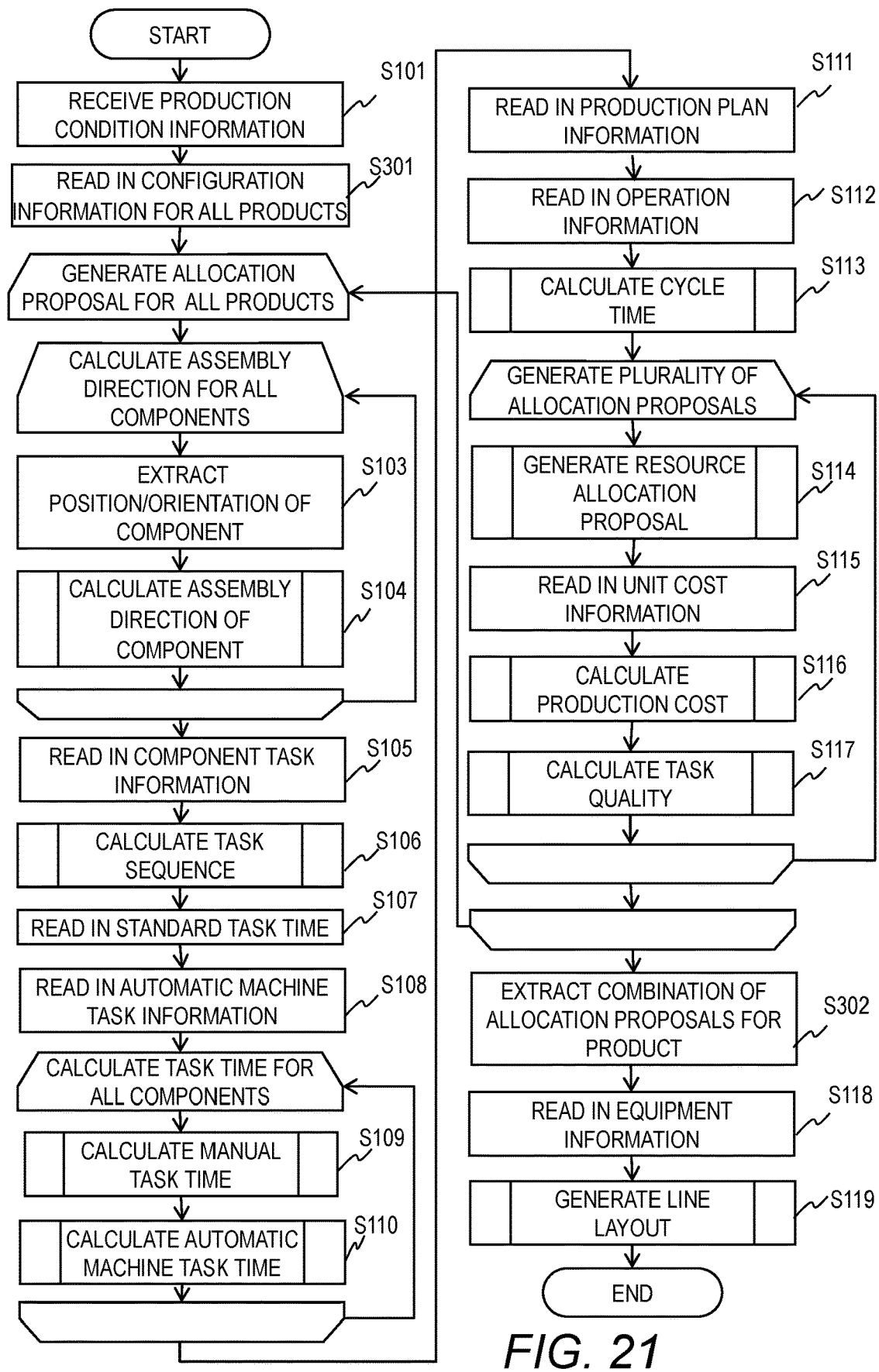
FIG. 21 shows a flowchart of a process example in which resource allocation proposals for the production line producing the plurality of types of products are generated by the line configuration planning device.

In the above embodiment, resource allocation proposals for a production line that produces only one type of product are generated. In the embodiment below, resource allocation proposals for a production line that simultaneously produces a plurality of types of products are generated. FIG. 21 shows a flowchart of a process example in which resource allocation proposals for the production line producing the plurality of types of products are generated by the line configuration planning device 10. Differences from the flow shown in FIG.

11 will be primarily described. In the present embodiment, resource allocation for a production line that simultaneously produces a plurality of types of products can be efficiently conducted.

As described above, the process described with reference to FIG. 11 is for a case in which one type of product is produced on the production line. In the process example shown in FIG. 21, allocation proposals for each of the plurality of types of products are generated as described with reference to FIG. 11, and a combination of preset conditions is selected from among the combination of allocation proposals, and is presented to the user as the allocation proposal.

With reference to FIG. 21, after receiving the production condition information (S101), the task sequence calculation unit 111 reads in product configuration information of all of the to-be-produced products produced in the production line, from the product configuration information 131 stored in the storage unit 103 (S301). The line configuration planning device 10 executes steps S103 to S117 for each of the product types to be produced, and generates an allocation proposal for each type of product.

Here, the required cycle time can be determined according to the total planned production count for all product types and the operation time of the production line, for example. In this example, the required cycle time is common to all product types. Alternatively, the required cycle time may be determined for each product type.

The resource allocation calculation unit 114 considers combinations of allocation proposals for all product types, and extracts some of the combinations of allocation proposals under preset conditions. Under the combination of allocation proposals, each piece of equipment and worker executes tasks for one or more types of the to-be-produced product. The extracted combination of allocation proposals must satisfy the condition of upper limits to the number of workers at each skill level, and have all estimated cycle times less than or equal to the required cycle time for the to-be-produced products. The resource allocation calculation unit 114 may extract a combination of allocation proposals for extraction on the basis of conditions defined regarding production cost and/or task quality as described with reference to FIG. 11.

Figure 22:
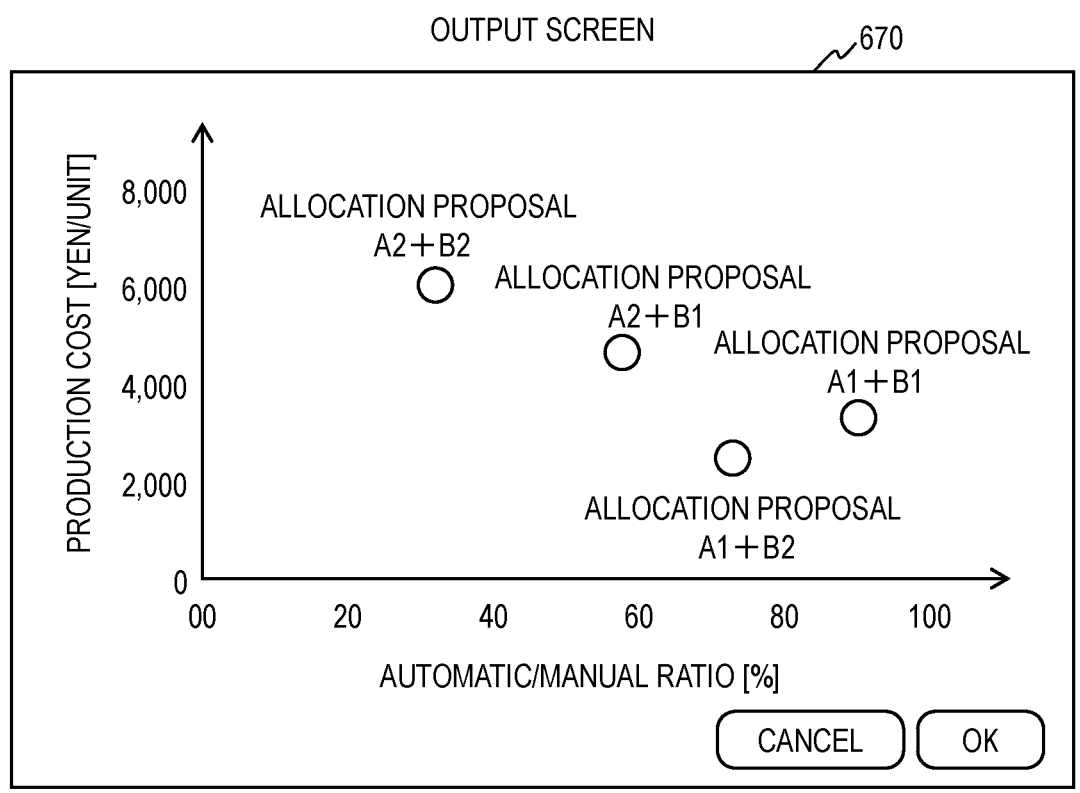
FIG. 22 shows an example of information, presented by the output unit, regarding the combination of resource allocation proposals of the production line where the plurality of types of products are produced. One combination of resource allocation proposals can be considered one resource allocation proposal for the production line.

FIG. 22 shows an example of information, presented by the output unit 106, regarding the combination of resource allocation proposals of the production line where the plurality of types of products are produced. One combination of resource allocation proposals can be considered one resource allocation proposal for the production line.

The output screen 670 of FIG. 22 indicates the production cost of each combination of allocation proposals. The horizontal axis of the graph of the output screen 670 indicates the proportion of automatic machines among the resources for each combination of allocation proposals, and the vertical axis indicates the production cost of each combination of allocation proposals. If all tasks were performed by automatic machines, the value on the horizontal axis would be 100%. In the example of FIG. 22, the output screen 570 indicates information regarding four combinations of allocation proposals for producing products A and B. By presenting the production costs of the allocation proposals to the user, it is possible to aid the selection by the user of the allocation proposal to be executed.

The output unit 106 can generate and present information regarding the allocation proposals indicated in FIGS. 13, 15, and 16 of Embodiment 1, even for (combinations of) allocation proposals of the production line for a plurality of types of products. This similarly applies to information described with reference to FIGS. 19 and 20.

Figure 23:
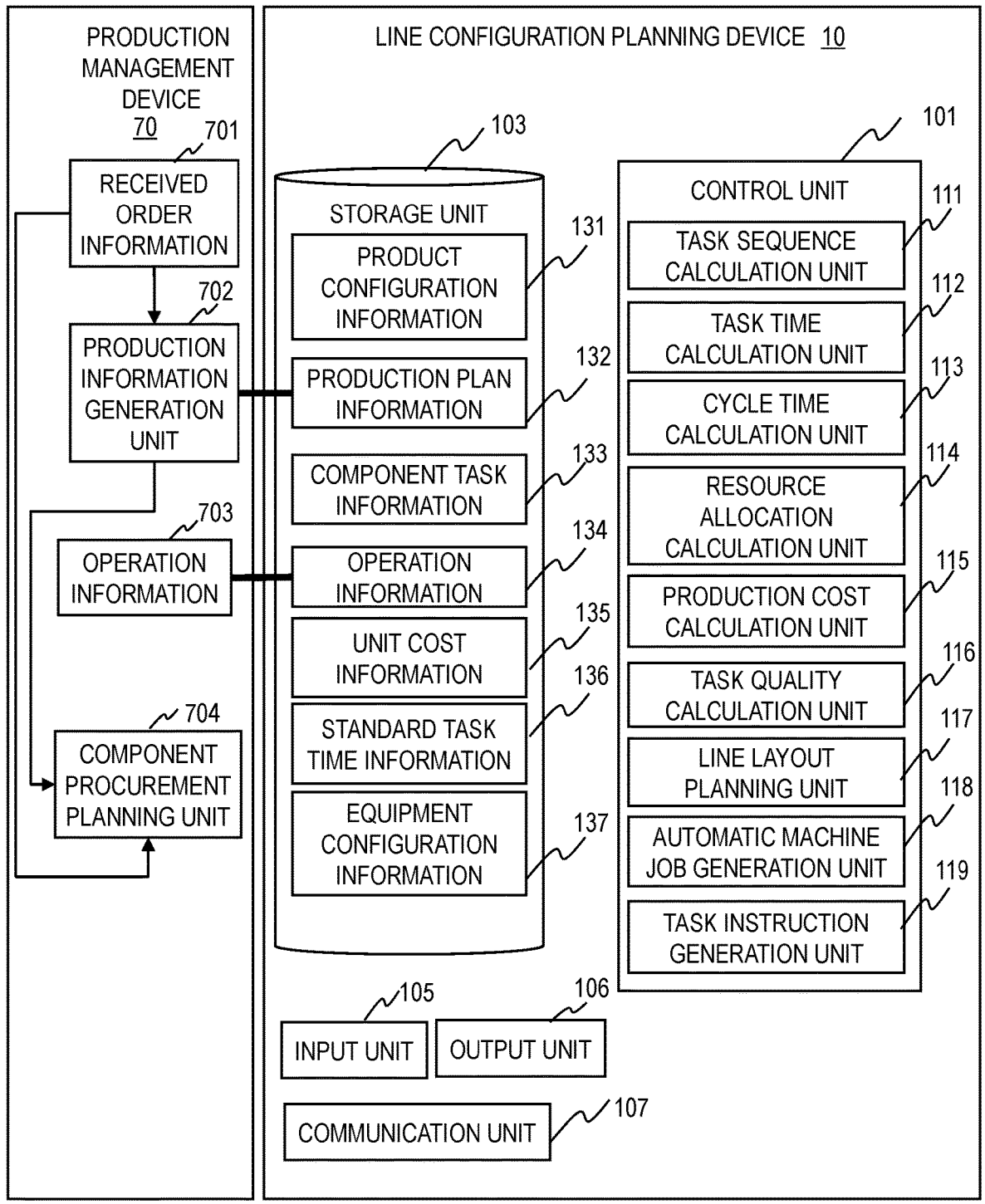
FIG. 23 shows a configuration example of a system including the line configuration planning device.

FIG. 23 shows a configuration example of a system including the line configuration planning device 10. The system additionally includes a production management device 70 that communicates with the line configuration planning device 10 via a network. The production management device 70 manages overall production of various products, and manages information regarding received orders for products (number of orders received, deadlines, etc.), operating conditions of production sites, procurement of components of the product, and the like.

The production management device 70 formulates a production plan for the products according to the managed information, and transmits the production plan to the line configuration planning device 10. The line configuration planning device 10 generates resource allocation proposals for the production line on the basis of the received production plan. The production management device 70 includes received order information 701, a production information generation unit 702, operation information 703, and a component procurement planning unit 704. The received order information 701 is information regarding received orders for products, and includes information such as the type of products for which orders were received, the number of products ordered, and deadlines. The component procurement planning unit 704 plans a procurement method for components for producing the ordered product on the basis of the received order information 701 and the production information generation unit 702.

The production information generation unit 702 generates a production plan for each of the products on the basis of the received order information. The production plan may have a similar configuration to the production plan information 132 of the line configuration planning device 10. The communication unit 107 of the line configuration planning device 10 includes the production plan received from the production management device 70 in the production plan information 132.

The operation information 703 includes information of various production sites, and some or all of the information matches the operation information 134 retained by the line configuration planning device 10. The production management device 70 extracts the necessary information from the operation information 703, and transmits the information to the line configuration planning device 10. The line configuration planning device 10 includes the received information in the operation information 134.

Similar to the line configuration planning device 10, the production management device 70 can be constituted of one or more computers including one or more processors and one or more storage devices. The production management device 70 can receive the received order information 701 and the operation information 703 via the input device thereof or from another computer that communicates therewith via a network. The acquired information is stored in the one or more storage devices. The production information generation unit 702 and the component procurement planning unit 704 are implemented by the one or more processors operating according to a program, for example. As described above, efficient production of products is enabled by the production management device 70 and the line configuration planning device 10 working in tandem.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings show control lines and information lines as considered necessary for explanations but do not show all control lines or information lines in the products. It can be considered that almost of all components are actually interconnected

What is claimed is:

1. A line configuration planning device that determines a configuration of a production line, the line configuration planning device comprising:
    one or more storage devices; and
    one or more processors,
    wherein the one or more storage devices store:
    operation information indicating an operating condition of a factory;
    equipment configuration information indicating a configuration of equipment including an automatic machine;
    product configuration information indicating a configuration of a to-be-produced product, the product configuration information including a plurality of components, and for each component information indicating a type, a dimension, a shape, a position and an orientation of the respective component within the product;
    task information indicating, for a plurality of combinations of a respective component type and a respective component shape, a combination and execution sequence of types of tasks to be executed;
    task time information indicating a task time by a worker or the automatic machine associated with the task type; and
    production plan information indicating a production volume and production period of the to-be-produced product, and
    wherein the one or more processors are configured to:
    determine a task sequence during production of the to-be-produced product based on the orientation and position of two or more components of the product included in the product configuration information and a corresponding combination and execution sequence of the types of tasks to be executed included in the task information,
    determine the task time by the worker or the automatic machine for each task on the basis of the task information and the task time information,
    determine a required cycle time for producing the to-be-produced product on the basis of the production plan information,
    generate, on the basis of the determined task sequence, task time, and required cycle time, an allocation proposal for the worker and the automatic machine such that an estimated cycle time for producing the to-be-produced product is less than or equal to the required cycle time, and
    determine a production line configuration for the to-be-produced product on the basis of the allocation proposal and the equipment configuration information.

2. The line configuration planning device according to claim 1,
    wherein the one or more storage devices:
    store unit cost information indicating a unit cost of the worker and the equipment, and
    wherein the one or more processors are configured to:
    generate a plurality of allocation proposals including the allocation proposal,
    determine a cost of each of the plurality of allocation proposals on the basis of the unit cost information, and
    select the allocation proposal from among the plurality of allocation proposals on the basis of the cost of each of the plurality of allocation proposals.

3. The line configuration planning device according to claim 1,
    wherein the one or more storage devices:
    store capability information indicating a capability of the worker and the equipment, and
    wherein the one or more processors are configured to:
    generate a plurality of allocation proposals including the allocation proposal,
    determine a task quality of each of the plurality of allocation proposals on the basis of the capability information, and
    select the allocation proposal from among the plurality of allocation proposals on the basis of the task quality of each of the plurality of allocation proposals.

4. The line configuration planning device according to claim 1,
    wherein the one or more processors are configured to display, on a display unit, the worker and the equipment to which tasks for producing the to-be-produced product are allocated.

5. The line configuration planning device according to claim 1,
    wherein the one or more storage devices:
    store unit cost information indicating a unit cost of the worker and the equipment, and
    wherein the one or more processors are configured to determine a cost of the allocation proposal on the basis of the unit cost information, and present the cost in an output device.

6. The line configuration planning device according to claim 1,
    wherein the one or more storage devices:
    store capability information indicating a capability of the worker and the equipment, and
    wherein the one or more processors are configured to determine a task quality of the allocation proposal on the basis of the capability information, and present the task quality in an output device.

7. The line configuration planning device according to claim 1,
    wherein the one or more processors are configured to generate a job for the automatic machine to execute the tasks for producing the to-be-produced product on the basis of the allocation proposal.

8. The line configuration planning device according to claim 1,
    wherein the one or more processors are configured to generate a written instruction for the worker to execute the tasks for producing the to-be-produced product on the basis of the allocation proposal.

9. The line configuration planning device according to claim 1,
wherein the one or more processors are configured to:
generate an allocation proposal for each of a plurality of types of to-be-produced products, and
combine the allocation proposals to generate a combination of allocation proposals for producing the plurality of types of the to-be-produced products on one production line, and
wherein the estimated cycle time of the combination of allocation proposals is less than or equal to the required cycle time of each of the plurality of types of the to-be-produced products.

10. A system, comprising:
the line configuration planning device according to claim 1; and
a production management device,
wherein the production management device generates the production plan information on the basis of received order information for the to-be-produced product, and transmits the production plan information to the line configuration planning device.

11. A method for a line configuration planning device to determine a production line configuration, the method comprising:
storing, by the line configuration planning device:
operation information indicating an operating condition of a factory;
equipment configuration information indicating a configuration of equipment including an automatic machine;
product configuration information indicating a configuration of a to-be-produced product, the product configuration information including a plurality of components, and for each component information indicating a type, a dimension, a shape, a position and an orientation;
task information indicating, for a plurality of combinations of a respective component type and a respective component shape, a combination and execution sequence of types of tasks to be executed;
task time information indicating a task time by a worker or the automatic machine associated with the task type;
product configuration information indicating a configuration of a to-be-produced product; and
production plan information indicating a production volume and production period of the to-be-produced product, and
executing, by the line configuration planning device:
determining a task sequence during production of the to-be-produced product based on the orientation and position of two or more components of the product included in the product configuration information and a corresponding combination and execution sequence of the types of tasks to be executed included in the task information;
determining a task time by the worker or the automatic machine for each task on the basis of the task information and the task time information;
determining a required cycle time for producing the to-be-produced product on the basis of the production plan information;
generating, on the basis of the determined task sequence, task time, and required cycle time, an allocation proposal for the worker and the automatic machine such that an estimated cycle time for producing the to-be-produced product is less than or equal to the required cycle time; and
determining a production line configuration for the to-be-produced product on the basis of the allocation proposal and the equipment configuration information.

12. The method according to claim 11,
wherein the line configuration planning device stores unit cost information indicating a unit cost of the worker and the equipment, and
wherein, in the method, the line configuration planning device:
generates a plurality of allocation proposals including the allocation proposal,
determines a cost of each of the plurality of allocation proposals on the basis of the unit cost information, and
selects the allocation proposal from among the plurality of allocation proposals on the basis of the cost of each of the plurality of allocation proposals.

13. The method according to claim 11,
wherein the line configuration planning device stores capability information indicating a capability of the worker and the equipment, and
wherein, in the method, the line configuration planning device:
generates a plurality of allocation proposals including the allocation proposal,
determines a task quality of each of the plurality of allocation proposals on the basis of the capability information, and
selects the allocation proposal from among the plurality of allocation proposals on the basis of the task quality of each of the plurality of allocation proposals.

14. The method according to claim 11,
wherein the line configuration planning device displays, on a display unit, the worker and the equipment to which tasks for producing the to-be-produced product are allocated.

15. The method according to claim 11,
wherein the line configuration planning device stores unit cost information indicating a unit cost of the worker and the equipment, and
wherein, in the method, the line configuration planning device determines a cost of the allocation proposal on the basis of the unit cost information, and presents the cost in an output device.

* * * * *